J. W. HARNEY.
MACHINE FOR MAKING BOX TOES.
APPLICATION FILED NOV. 17, 1911.

1,039,052.

Patented Sept. 17, 1912.
5 SHEETS—SHEET 1.

Witnesses:
N. C. Lombard
Mary C. Smith

Inventor:
John W. Harney,
by Walter E. Lombard
Atty.

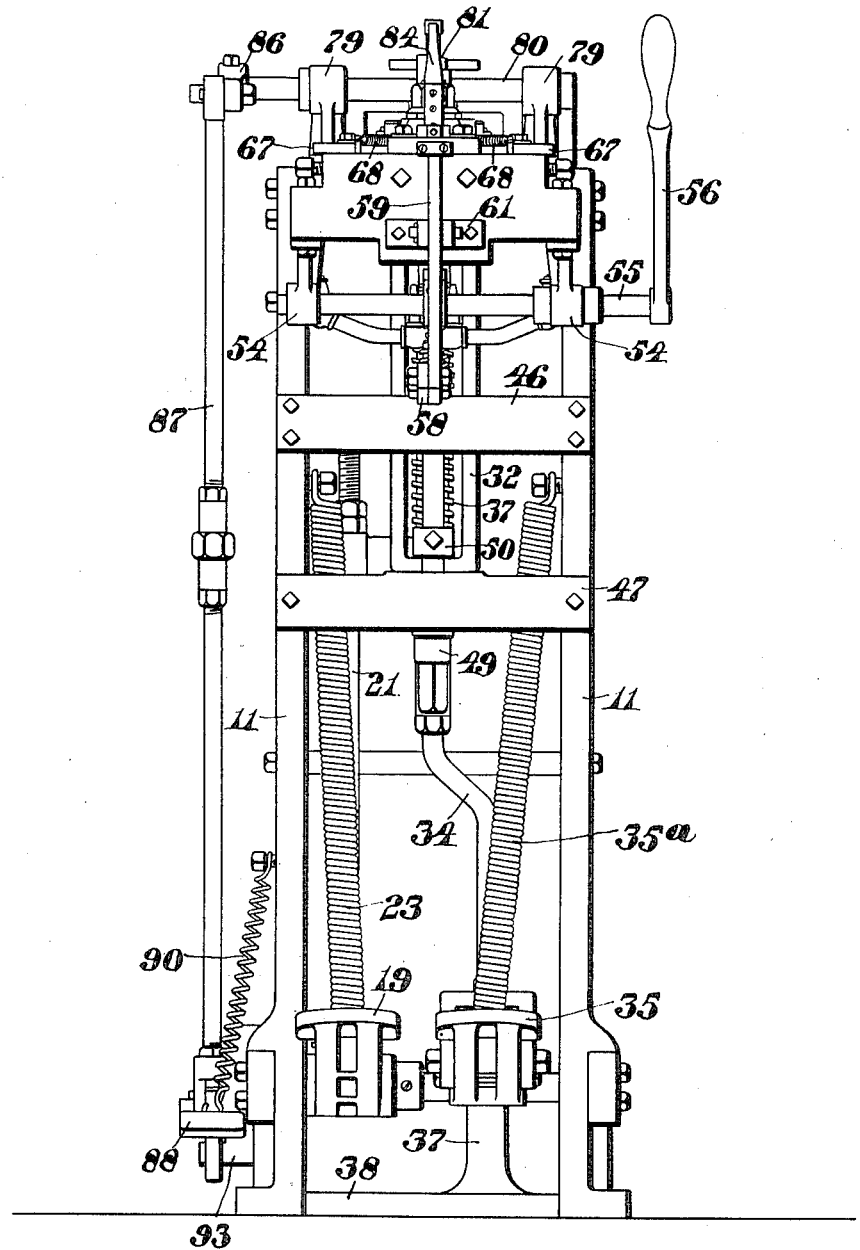

J. W. HARNEY.
MACHINE FOR MAKING BOX TOES.
APPLICATION FILED NOV. 17, 1911.

1,039,052.

Patented Sept. 17, 1912.
5 SHEETS—SHEET 3.

Witnesses:
N. C. Lombard
Mary C. Smith

Inventor:
John W. Harney,
by Walter E. Lombard,
Atty.

J. W. HARNEY.
MACHINE FOR MAKING BOX TOES.
APPLICATION FILED NOV. 17, 1911.

1,039,052.

Patented Sept. 17, 1912.

5 SHEETS—SHEET 4.

Witnesses:
N. C. Lombard
Mary C. Smith

Inventor:
John W. Harney,
by Walter E. Lombard,
Atty.

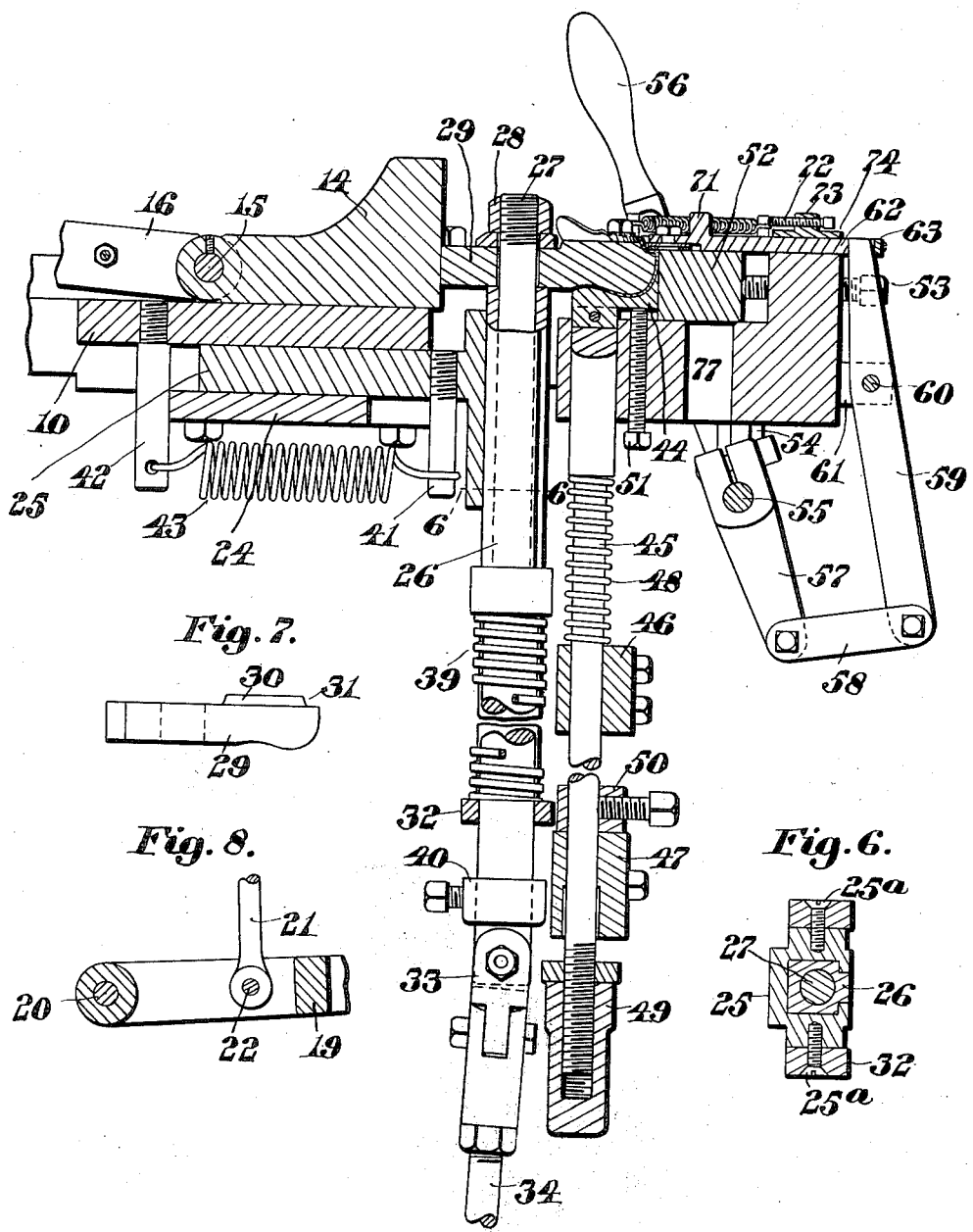

UNITED STATES PATENT OFFICE.

JOHN W. HARNEY, OF LYNN, MASSACHUSETTS.

MACHINE FOR MAKING BOX-TOES.

1,039,052.  Specification of Letters Patent.  Patented Sept. 17, 1912.

Application filed November 17, 1911. Serial No. 660,913.

*To all whom it may concern:*

Be it known that I, JOHN W. HARNEY, a citizen of the United States of America, and a resident of Lynn, in the county of Essex and State of Massachusetts, have invented certain new and useful Improvements in Machines for Making Box-Toes, of which the following is a specification.

This invention relates to machines for making molded box toes and particularly box toes having an inwardly projecting flange provided with a ribbed projection adapted in the manufacture of a shoe to be positioned between the rib of the inner sole and the welt so that the three may be united by a single row of stitches.

The invention consists in certain novel features of construction and arrangement of parts which will be readily understood by reference to the description of the drawings and to the claims hereinafter given.

Figure 1:
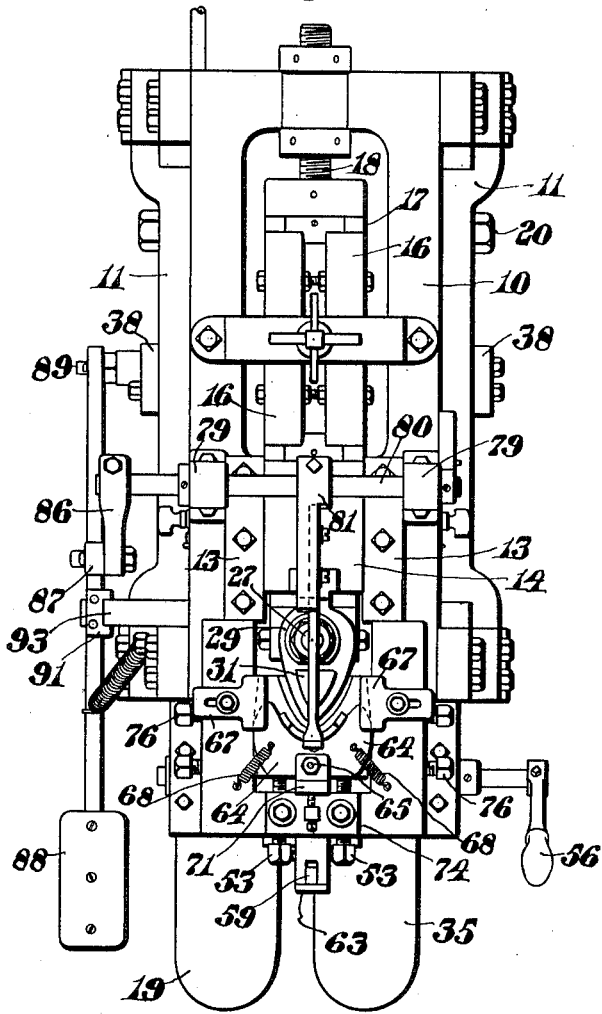
Figure 9:
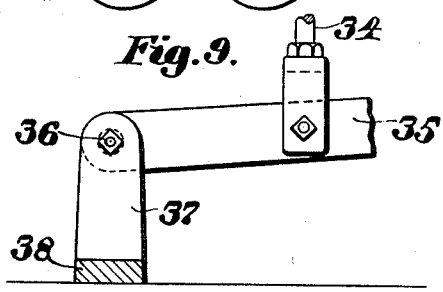
Figure 3:
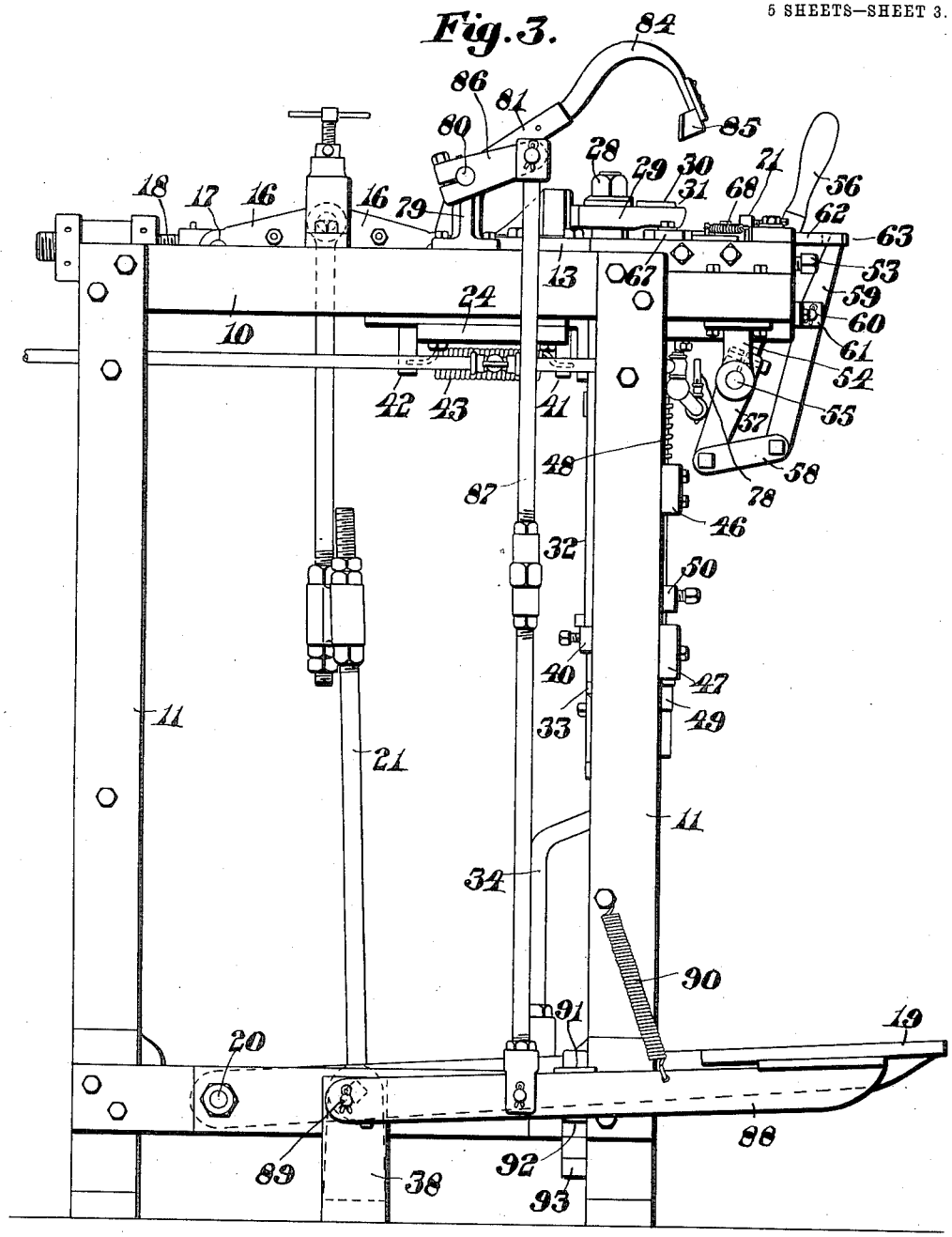
Figure 4:
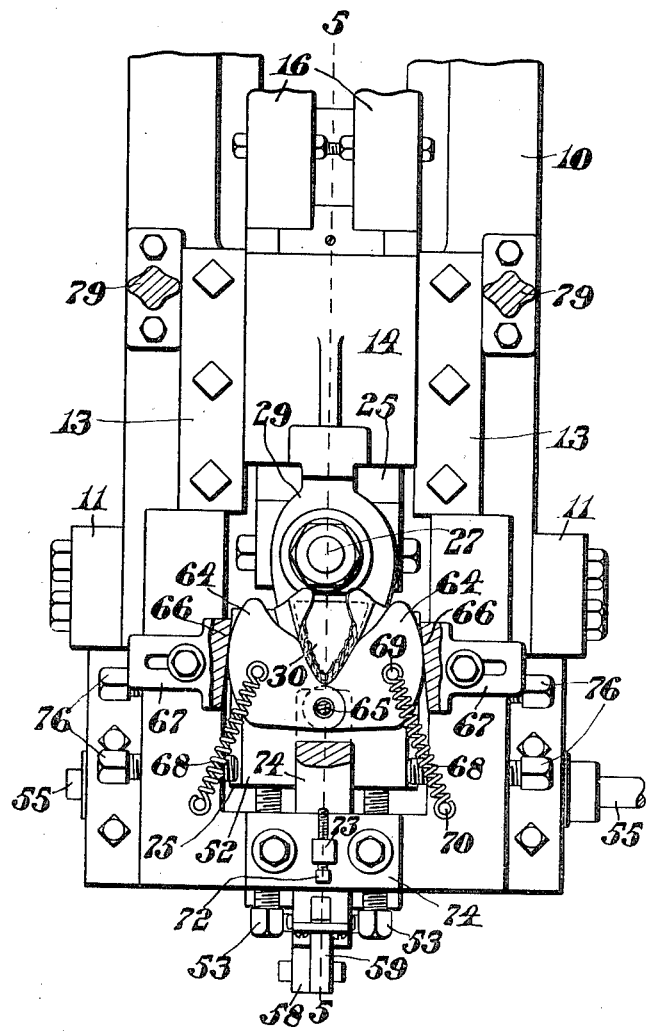
Figure 10:
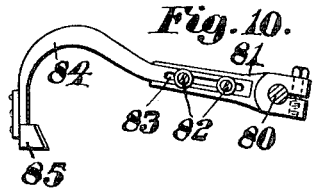

Of the drawings: Figure 1 represents a plan of a machine embodying the features of the present invention. Fig. 2 represents a front elevation of the same. Fig. 3 represents a side elevation of the same. Fig. 4 represents a plan of the front portion of the machine drawn to an enlarged scale. Fig. 5 represents a section of the same, the cutting plane being on line 5—5 on Fig. 4. Fig. 6 represents a sectional detail, the cutting plane being on line 6—6 on Fig. 5. Fig. 7 represents an elevation of the male mold. Figs. 8 and 9 represent sectional details showing the pivoted ends of the main treadles, and Fig. 10 represents an elevation of the blank positioning device.

Similar characters designate like parts throughout the several figures of the drawings.

In the drawings, 10 represents a table forming a part of a supporting framework 11, having mounted thereon between the guides 13—13 a slidable member 14 which has pivotally secured thereto at 15 a toggle mechanism 16, the opposite end of which is pivotally connected at 17 to the adjustable member 18, by which the operation of the said toggle mechanism 16 may be varied in the usual manner. This toggle mechanism 16 is operable by means of the treadle 19 pivoted at 20 and connected thereto by means of the rod 21 pivotally connected to said treadle at 22. It is self-evident that a depression of the treadle 19 will straighten the toggle mechanism 16 and move the member 14 toward the front of the machine, and when pressure is removed from said treadle the various parts will be returned to their normal position by means of the spring 23.

Beneath the table 10, in suitable guides 24, is mounted a slidable member 25 having slidably mounted in its forward end a ribbed sleeve 26 through which extends a vertical rod 27 having mounted thereon between said sleeve 26 and suitable locking nuts 28 a male mold 29 provided with an upward extension 30, the wall 31 of which is set back slightly from the edge of said mold, while the upper face of said mold between said wall 31 and the edge is flat and substantially at right angles to the side wall of said mold. The rod 27 extends downwardly through a bail 32 secured to the slidable member 25 by screws 25ª, said rod 27 having secured to its lower end a universal joint 33, the opposite end of which is connected to a rod 34 pivotally connected to a treadle 35 pivoted at 36 to a lug 37 formed upon a cross member 38 secured to the framework 11.

Surrounding the rod 27 between the end of the sleeve 26 and the bail 32 is a spring 39, adapted to keep the male mold 29 in its normal upward position, a sleeve 40 secured to the rib 27 limiting this upward movement by coming in contact with the under face of the bale 32. The treadle 35 is returned to its normal position by means of the spring 35ª. The slide 25 has a pin 41 therein, between which and a pin 42 secured to the table 10 is a spring 43 adapted to retain the slide 25 in its rearward position under normal conditions. It is self-evident, however, from an inspection of the drawings, that when the toggle 16 is straightened, and the member 14 is forced toward the front of the machine, its movement will push the male mold 29 forward and with it the slide 25 and the bail 32 carried thereby, the toggle joint 33 between the treadle rod 34 and the rod 27 permitting this reciprocatory movement of said members.

The forward end of the mold 29 is adapted to fit the female mold 44 secured to a vertical rod 45 mounted in a bearing in the forward end of the table 10. The reduced end of said rod 45 is also mounted in bearings in the tie members 46 and 47. A spring 48 interposed between the tie member 46 and the enlarged end of the rod 45 tends to keep the female mold 44 in its normal upward position. This upward movement of the female mold is limited by the stop members 49 threaded to the lower end of the rod and contacting with the under face of the tie member 47. Adjustably secured to the rod 45 between the tie members 46 and 47 is a stop member 50 adapted to limit the downward movement of said rod during the molding of the blank.

The female mold 44 during the operation of molding contacts with the adjustable member 51 threaded to the table 10. Against the forward end face of the female mold 44 a block 52 rests in a depression in the upper face of the table 10, the position of said block being determined by the adjusting screws 53. These adjusting screws 53 are adapted to sustain the pressure brought to bear upon the block 52 and the female mold 44 when the toggle 16 is straightened and the male mold 29 is moved toward the front of the machine. In brackets 54 depending from the under face of the table 10 is an oscillating shaft 55, to the outer end of which is secured the manually controlled lever 56.

Between the brackets 54 and secured to the oscillating shaft 55 is an arm 57 connected by means of the link 58 with the lever 59 pivoted at 60 to ears 61 formed upon or secured to the front face of the table 10. The upper end of the lever 59 extends into a slot formed in the forward end of the slidable member 62, the end of which is closed by means of the plate 63. Normally the position of the operating handle 56 is that shown in Fig. 3 of the drawings, but when the operator moves the handle into the position shown in Fig. 5 of the drawings, it is obvious that the sliding plate 62 will be moved to the rear so that the wiper member 64 pivoted thereto at 65 will be forced against the inclined faces 66 of the adjustable cam member 67 so that said wiper members will act upon the edges of the blank extending upwardly from between the molds 29 and 44, and cause these edges to be pressed down against the flat upper face of the mold 29 and against the substantially vertical wall 31 of the extension 30, as is indicated in Figs. 4 and 5 of the drawings. When the operator moves the handle 56 to its normal position, thereby moving the slide 62 and the wiper 64 toward the front of the machine, the springs 68, interposed between the pins 69 on said wiper members and other pins 70 on the table 10, will move said wiper members about the pivot 65 into their normal positions. The slide 62 is provided with a lug 71 extending upwardly therefrom, which, in order to limit the movement of said slide, is adapted to come into contact with the adjustable members 72 threaded to the lug 73 formed upon a closing plate 74 extending over the groove in which the slide 62 is mounted. The block 52 is provided with inclined sides 75 with which engage the ends of the threaded members 76 mounted in the table 10, these threaded members 76 holding the block 52 in position and preventing its lifting.

When it is desired to substitute a new form of female mold 44, the cap plate 74 is removed, permitting the removal of the slide 62 with the wiper members 64. A new female mold 44 is then substituted for the old mold, a companion male mold being substituted for the mold 29 at the same time. Beneath the block 52 the table 10 is provided with an opening 77 therethrough, through which the heat from a gas jet 78 is permitted to enter for the purpose of keeping the block and female mold heated during the molding operation.

To the rear of the male mold 29 and on either side of the member 14, brackets 79 are secured to the table 10, these brackets having bearings therein for the oscillating shaft 80. Secured to the shaft 80 is an arm 81, which in turn has adjustably secured thereto by means of the screws 82, extending through a slot 83, the curved finger 84, to the extreme end of which is fastened a toe piece 85 shaped to conform with the forward end of the male die 29. To one end of the shaft 80 is secured an arm 86 connected by the rod 87 to a treadle 88 pivoted at 89 to the member 38. Normally the treadle 88 is retained in raised position by means of the spring 90. When, however, the operator has depressed the treadle 88 he may, by a slight movement to the left, cause the projecting member 91 secured to said treadle to engage with the shoulder 92 on the locking plate 93 secured to the frame 11, thereby holding the treadle 88 in depressed position and the toe piece 85 upon the blank to be operated upon.

When it is desired to mold the blank to form a molded box toe, the various parts of the machine are in the position shown in Fig. 3, with the male mold 29 and the positioning member 85 in raised position and the handle 56 toward the front of the machine. The blank is then inserted upon the female mold 44 in the path of movement of the male mold 29 with the edges thereof extending beyond the edge of said mold 29. The operator then depresses the treadle 88, thereby causing the toe piece 85 to be pressed against the blank, and while in this position the treadle 88 is locked by the engagement of the locking members 90 and 92. The pressure upon the blank is sufficient to retain it in position during the molding operation. The blank is thoroughly moistened when placed in position between the molds 29 and 44, and when the male mold is depressed by means of the treadle 35 the blank is made to conform to the shape of the male and female dies in use, both of these dies being interchangeable to accommodate themselves to any particular form of last. When this molding has been accomplished, the toe piece 85 is raised by unlocking the treadle 88 and permitting the spring 90 to act thereon. The operator then seizes the handle 56 and forces it to the rear, while the male mold 29 is still depressed. The movement of the handle 56 will cause the wipers 64 to be moved against the upwardly extending edges of the blank, thereby forcing them over the flat upper face of the male mold 29, with the extreme portions thereof extending upwardly against the side wall 31 of the extension 30, thereby forming a ribbed extension on the box toe, which is adapted in the construction of a welt shoe to be placed between its welt and the rib of the inner sole, so that the three may be united by a single row of stitches. While the wipers are in their operating position as indicated in Figs. 4 and 5, and the male member is still depressed, pressure is applied to the treadle 19, thereby straightening the toggle 16 and forcing the male member 29 forwardly into the female mold 44, thus more effectually completing the shaping of the box toe. During the operation of molding, the mold 44 is heated from the gas flame 78, thereby removing the moisture from the blank being molded and causing the molded blank to retain its shape when removed from between the two molds. Pressure is first removed from the treadle 19 to permit the toggle 16 to return to its normal position as indicated in Fig. 3, and then the wiper members 64 are moved toward the operator by means of the handle 56. Pressure is then removed from the treadle 35 to permit the springs 35ª and 39 to return the male die 29 to its normal raised position. The molded box toe is lifted therewith into position so that it can be readily removed from the male die 29 and the various parts of the machine are in position for the insertion of a new blank and the repetition of the operation described.

It is believed that the operation and many advantages of the invention will be thoroughly understood from the foregoing.

Having thus described my invention, I claim:

1. In a machine of the class described, the combination of a female mold; a coacting male mold provided with an upward extension and a flat face between its edge and said extension; and slidable wiper members pivoted together with edges conforming to the wall of said extension and adapted to turn the edges of a blank over said flat face and form a rib on said blank against said extension wall.

2. In a machine of the class described, the combination of a female mold; a coacting male mold provided with an upward extension and a flat face between its edge and said extension; a pivoted member adapted to position the blank by being forced temporarily into contact with a portion thereof extending beyond the walls of said molds; means for depressing said male mold into said female mold; and wiper members adapted to subsequently turn over the edges of said blank in contact with said flat face and the wall of said extension.

3. In a machine of the class described, the combination of a female mold; a coacting male mold provided with an upward extension and a flat face between its edge and said extension; a pivoted member fitting the end of said male mold adapted to be forced temporarily into contact with the blank to position it; means for depressing said male mold into said female mold; and wiper members adapted to subsequently turn over the edges of said blank in contact with said flat face and the wall of said extension.

4. In a machine of the class described, the combination of a female mold; a coacting male mold provided with an upward extension and a flat face between its edge and said extension; a pivoted member fitting the end of said male mold adapted to be forced temporarily into contact with the blank to position it; means for locking said pivoted member in operative position; means for depressing said male mold into said female mold; and wiper members adapted to subsequently turn over the edges of said blank in contact with said flat face and the wall of said extension.

5. In a machine of the class described, the combination of a female mold; a coacting male mold provided with an upward extension and a flat face between its edge and said extension; slidable pivoted wiper members adapted to turn the edges of a blank over said flat face and form a rib on said blank against the wall of said extension; and adjustable members adapted to engage the edges of said wiper members to limit the outward movement thereof about their pivot.

6. In a machine of the class described, the combination of a female mold; a spring pressed support for said mold; a coacting male mold provided with an upward extension and a flat face between its edge and said extension; a pivoted member adapted to be forced temporarily into contact with the blank to position it; means for depressing said male mold into said female mold; and wiper members adapted to subsequently turn over the edges of said blank in contact with said flat face and the wall of said extension.

7. In a machine of the class described, the combination of a female mold; a spring pressed support for said mold; means for limiting the movement of said mold; a coacting male mold provided with an upward extension and a flat face between its edge and said extension; a pivoted member adapted to be forced temporarily into contact with the blank to position it; means for depressing said male mold into said female mold; and wiper members adapted to subsequently turn over the edges of said blank in contact with said flat face and the wall of said extension.

8. In a machine of the class described, the combination of a female mold; a coacting male mold provided with an upward extension and a flat face between its edge and said extension; a slidable member; wiper members pivoted thereto and adapted to operate upon a blank held between said molds; cams engaging the edges of said wiper members and adapted to force said wiper members about their pivot toward each other during the forward movement of said slidable member; springs for returning said wiper members to their normal position; and a manually controlled lever for operating said slidable member.

9. In a machine of the class described, the combination of a female mold; a coacting male mold provided with an upward extension and a flat face between its edge and said extension; a slidable member; wiper members pivoted thereto and adapted to operate upon a blank held between said molds; cams engaging the edges of said wiper members and adapted to force said wiper members about their pivot toward each other during the forward movement of said slidable member; springs for returning said wiper members to their normal position; a manually controlled lever for operating said slidable member; and adjustable means for limiting the outward movement of said slidable member.

10. In a machine of the class described, the combination of a female mold; a coacting male mold provided with an upward extension and a flat face between its edge and said extension; a spring controlled support for said male mold; treadle mechanism for operating said support; and wiper members adapted to subsequently turn over the edges of a blank between said molds in contact with said flat face and the wall of said extension.

11. In a machine of the class described, the combination of a female mold; a coacting male mold provided with an upward extension and a flat face between its edge and said extension; means for depressing said male mold into said female mold; means fitting the outer wall of the male mold adapted to position the blank during the depression of said mold; means for subsequently applying pressure to the rear of said mold; and means for then wiping the edges of the blank over the flat face of said mold and against the wall of said extension.

12. In a machine of the class described, the combination of a female mold; a coacting male mold provided with an upward extension and a flat face between its edge and said extension; means for depressing said male mold into said female mold; means fitting the outer wall of the male mold adapted to position the blank during the depression of said mold; means for subsequently applying pressure to the rear of said mold; means for then wiping the edges of the blank over the flat face of said mold and against the wall of said extension; and means for returning said mold to its normal position.

Signed by me at 4 Post-Office Sq., Boston, Mass., this 14th day of November, 1911.

JOHN W. HARNEY.

Witnesses:
WALTER E. LOMBARD,
NATHAN C. LOMBARD.